United States Patent
Holzmann et al.

(10) Patent No.: US 6,624,285 B2
(45) Date of Patent: Sep. 23, 2003

(54) POLYESTERS BLOCKED WITH ISOMERIC NONANOLS, METHOD FOR PRODUCING THEM AND USE THEREOF AS SOFTENERS

(75) Inventors: Jürgen Holzmann, Ludwigshafen (DE); Boris Breitscheidel, Limburgerhof (DE); Walter Disteldorf, Wachenheim (DE); Christiane Haller, Brühl (DE); Bernd Morsbach, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/168,957

(22) PCT Filed: Dec. 12, 2000

(86) PCT No.: PCT/EP00/12577

§ 371 (c)(1),
(2), (4) Date: Jun. 24, 2002

(87) PCT Pub. No.: WO01/48049

PCT Pub. Date: Jul. 5, 2001

(65) Prior Publication Data

US 2003/0004300 A1 Jan. 2, 2003

(30) Foreign Application Priority Data

Dec. 23, 1999 (EP) .............................................. 99125759

(51) Int. Cl.[7] .............................................. C08G 63/66
(52) U.S. Cl. ........................ 528/300; 528/301; 525/437
(58) Field of Search ................................ 528/300, 301; 525/437

(56) References Cited

U.S. PATENT DOCUMENTS

| 4,291,127 A | 9/1981 | Akabayashi |
| 5,281,647 A | 1/1994 | Eapen |
| 5,849,972 A | 12/1998 | Vicari |

FOREIGN PATENT DOCUMENTS

| CA | 2111360 | 6/1994 |
| DE | 28 55 421 | 7/1979 |
| DE | 104 737 | 9/1994 |
| DE | 43 39713 | 5/1995 |
| DE | 19924 339 | 11/2000 |
| EP | 278 407 | 8/1988 |
| EP | 603 630 | 6/1994 |
| GB | 1173323 | 12/1969 |
| WO | 92/13818 | 8/1992 |

OTHER PUBLICATIONS

Catalysis Today, vol. 6, No. 3, 1990, O'Connor et al.
Ulmann's Enc. vol. A1,–vol. A9, 572–575; 214–220.
Japan Abst. 55124737.

*Primary Examiner*—Samuel A. Acquah
(74) *Attorney, Agent, or Firm*—Keil & Weinkauf

(57) ABSTRACT

Polyesters suitable as plasticizers and obtainable by reacting aliphatic dicarboxylic acids, neopentyl glycol, at least one other diol and a nonanol mixture, where the nonanol mixture is mainly composed of 1-nonanol, of monomethyloctanols, of dimethylheptanols and of monoethylheptanols.

The nonanol mixture is also described, as is the use of the plasticizers.

6 Claims, No Drawings

POLYESTERS BLOCKED WITH ISOMERIC NONANOLS, METHOD FOR PRODUCING THEM AND USE THEREOF AS SOFTENERS

Polyesters capped by isomeric nonanols, a process for their preparation, and their use as plasticizers Plastics are mostly based on materials obtainable by polymerization of organic monomers. Depending on their chemical constitution and on the particular circumstances of the preparation process, these polymers have characteristic physical properties, such as flexibility.

In order to achieve controlled changes in the usage properties of the polymers, prior to their processing to give products for use it is also usual to incorporate additives, e.g. fillers, dyes, flame retardants and plasticizers. The plasticizers serve to maintain or further improve the flexibility of the resultant consumer articles.

One polymer for which the issues described here are of very particular significance is polyvinyl chloride, which is produced on a large scale industrially and is found in an endless variety of articles in daily use.

Depending on the group of chemicals to which a plasticizer belongs, its use can raise quite specific new areas of work for the skilled worker. One of these which is receiving particular attention is the discharge of plasticizers out of the materials, for example via bleeding, where the plasticizer mostly forms a liquid film on the surface of the material, or by evaporation. Another phenomenon is migration: the escape of the plasticizer from the material followed by permeation into a plastic with which it is in contact.

An important class of plasticizers is that of polyesters of dicarboxylic acids. They are used in particular in producing films, coatings, profiles, floorcoverings and cables based on plasticized PVC when relatively high requirements are placed on resistance to extraction, especially in contact with gasoline, or with oils or fats, and also on the UV resistance and volatility of the plasticizer.

There are known polyester plasticizers made from dicarboxylic acids and from diols and having terminal alcohol groups—from syntheses using an excess of diol—or terminal acid groups—from syntheses using an excess of dicarboxylic acid—these groups having been esterified, i.e. "capped", with monocarboxylic acids or, respectively, monohydric alcohols.

RO-B 104 737 discloses a process for preparing aliphatic linear polyester plasticizers, by reacting adipic acid with propylene glycol and 2-ethylhexanol.

GB-A 1 173 323 describes PVC compositions comprising a plasticizer which may have been built up from adipic acid, 1,2-propanediol and isodecanol, for example.

U.S. Pat. No. 5,281,647 discloses a process for preparing a plasticizer, by reacting, for example, adipic acid with a sterically hindered diol, such as neopentyl glycol, and with another diol, for example a butylene glycol. The resultant product is then reacted with a mono alcohol, and the alcohol here may be a nonyl alcohol.

However, the known plasticizers of polyester type still have inadequate compatibility with PVC, and therefore suffer a considerable extent of discharge during use. Over the course of time this results in a marked reduction in flexibility, for example of plasticized PVC compounds prepared using these plasticizers. In addition, these known plasticizers exhibit a high degree of migration from materials of this type into other plastics with which they come into contact.

It is an object of the present invention, therefore, to provide plasticizers of polyester type which have good compatibility with plastics, in particular when processed into plasticized PVC compounds, and exhibit only a low tendency to migrate into other plastics with which they come into contact.

We have found that this object is achieved by means of polyesters suitable as plasticizers and obtained by reacting aliphatic dicarboxylic acids, neopentyl glycol, at least one other diol and a nonanol mixture, where the nonanol mixture is mainly composed of 1-nonanol, of monomethyloctanols, of dimethylheptanols and of monoethylheptanols.

Novel nonanol mixtures have also been found, as have a process for preparing the polyesters and the use of the polyesters as plasticizers for plastics or polymers.

For the purposes of the present invention, since the dicarboxylic acids, the neopentyl glycol, the other diol(s) and the nonanol mixture are reacted to give the polyesters of the invention, the composition of the polyesters in terms of the starting materials refers to dicarboxylic acid units, neopentyl glycol units, diol units and, respectively, nonanol units in the polyester.

According to the earlier German patent application with the official file reference number 19924339.5, the nonanol mixture used according to the invention is particularly advantageously obtainable in a process involving two or more stages and starting from a hydrocarbon mixture comprising butenes. In a first step, the butenes are dimerized to give a mixture of isomeric octenes. The octene mixture is then hydroformylated to give $C_9$ aldehydes and then hydrogenated to give the nonanol mixture. In this reaction sequence, specific, defined parameters have to be adhered to, at least during the butene dimerization, preferably during the butene dimerization and the hydroformylation.

It is preferable, therefore, that the isomeric octenes mixture is obtained by bringing a hydrocarbon mixture comprising butenes into contact with a heterogeneous catalyst comprising nickel oxide. The isobutene content of the hydrocarbon mixture is preferably 5% by weight or less, in particular 3% by weight or less, particularly preferably 2% by weight or less, and most preferably 1.5% by weight or less, based in each case on the total butene content. A suitable hydrocarbon stream is that known as the $C_4$ cut, a mixture of butenes and butanes, available in large quantities from FCC plants or from steam crackers. A starting material used with particular preference is that known as raffinate II, which is an isobutene-depleted $C_4$ cut.

A preferred starting material comprises from 50 to 100% by weight, preferably from 80 to 95% by weight, of butenes and from 0 to 50% by weight, preferably from 5 to 20% by weight, of butanes. The following makeup of the butenes can be given as a general guide to quantities:

| | |
|---|---|
| 1-butene | from 1 to 98% by weight, |
| cis-2-butene | from 1 to 50% by weight, |
| trans-2-butene | from 1 to 98% by weight, and |
| isobutene | up to 5% by weight. |

Possible catalysts are catalysts known per se and comprising nickel oxide, as described, for example, by O'Connor et al. in Catalysis Today, 6, (1990) p. 329. Supported nickel oxide catalysts may be used, and possible support materials are silica, alumina, aluminosilicates, aluminosilicates having a layer structure and zeolites. Particularly suitable catalysts are precipitation catalysts obtainable by mixing aqueous solutions of nickel salts and of silicates, e.g. of sodium silicate and sodium nitrate, and, where appropriate, of other constituents, such as aluminum salts, e.g. aluminum nitrate, and calcining.

Particular preference is given to catalysts which essentially consist of NiO, $SiO_2$, $TiO_2$ and/or $ZrO_2$, and also, where appropriate, $Al_2O_3$. A most preferred catalyst comprises, as significant active constituents, from 10 to 70% by weight of nickel oxide, from 5 to 30% by weight of titanium dioxide and/or zirconium dioxide and from 0 to 20% by weight of aluminum oxide, the remainder being silicon dioxide. A catalyst of this type is obtainable by precipitating the catalyst composition at pH from 5 to 9 by adding an aqueous solution comprising nickel nitrate to an aqueous alkali metal waterglass solution which comprises titanium dioxide and/or zirconium dioxide, filtering, drying and annealing at from 350 to 650° C. For details of preparation of these catalysts reference may be made to DE-A 4339713. The entire content of the disclosure of that publication is incorporated herein by way of reference.

The hydrocarbon mixture comprising butenes is brought into contact with the catalyst, preferably at temperatures of from 30 to 280° C., in particular from 30 to 140° C. and particularly preferably from 40 to 130° C. This preferably takes place at a pressure of from 10 to 300 bar, in particular from 15 to 100 bar and particularly preferably from 20 to 80 bar. The pressure here is usefully set in such a way that the olefin-rich hydrocarbon mixture is liquid or in the supercritical state at the temperature selected.

Examples of reactors suitable for bringing the hydrocarbon mixture into contact with the heterogeneous catalyst are tube-bundle reactors and shaft furnaces. Shaft furnaces are preferred because the capital expenditure costs are lower. The dimerization may be carried out in a single reactor, where the oligomerization catalyst may have been arranged in one or more fixed beds. Another way is to use a reactor cascade composed of two or more, preferably two, reactors arranged in series, where the butene dimerization in the reaction mixture is driven to only partial conversion on passing through the reactor(s) preceding the last reactor of the cascade, and the desired final conversion is not achieved until the reaction mixture passes through the last reactor of the cascade. The butene dimerization preferably takes place in an adiabatic reactor or in an adiabatic reactor cascade.

After leaving the reactor or, respectively, the last reactor of a cascade, the octenes formed and, where appropriate, higher oligomers, are separated off from the unconverted butenes and butanes in the reactor discharge. The oligomers formed may be purified in a subsequent vacuum fractionation step, giving a pure octene fraction. During the butene dimerization, small amounts of dodecenes are generally also obtained. These are preferably separated off from the octenes prior to the subsequent reaction.

In a preferred embodiment, some or all of the reactor discharge, freed from the oligomers formed and essentially consisting of unconverted butenes and butanes, is returned. It is preferable to select the return ratio such that the concentration of oligomers in the reaction mixture does not exceed 35% by weight, preferably 20% by weight, based on the hydrocarbon mixture of the reaction. This measure increases the selectivity of the butene dimerization in relation to those octenes which, after hydroformylation, hydrogenation and esterification, give a particularly preferred nonanol mixture.

The octenes obtained are converted, in the second process step, by hydroformylation using synthesis gas in a manner known per se, into aldehydes having one additional carbon atom. The hydroformylation of olefins to prepare aldehydes is known per se and is described, for example, in J. Falbe, (ed.): New Synthesis with Carbon monoxide, Springer, Berlin, 1980. The hydroformylation takes place in the presence of catalysts homogeneously dissolved in the reaction medium. The catalysts generally used here are compounds or complexes of metals of transition group VIII, specifically Co, Rh, Ir, Pd, Pt or Ru compounds, or complexes of these metals, either unmodified or modified, for example, using amine-containing or phosphine-containing compounds.

For the purposes of the present invention, the hydroformylation preferably takes place in the presence of a cobalt catalyst, in particular dicobaltoctacarbonyl $[CO_2(CO)_8]$. It preferably takes place at from 120 to 240° C., in particular from 160 to 200° C., and under a synthesis gas pressure of from 150 to 400 bar, in particular from 250 to 350 bar. The hydroformylation preferably takes place in the presence of water. The ratio of hydrogen to carbon monoxide in the synthesis gas mixture used is preferably in the range from 70:30 to 50:50, in particular from 65:35 to 55:45.

The cobalt-catalyzed hydroformylation process may be carried out as a multistage process which comprises the following 4 stages: the preparation of the catalyst (precarbonylation), the catalyst extraction, the olefin hydroformylation and the removal of the catalyst from the reaction product (decobaltization). In the first stage of the process, the precarbonylation, an aqueous cobalt salt solution, e.g. cobalt formate or cobalt acetate, as starting material is reacted with carbon monoxide and hydrogen to prepare the catalyst complex needed for the hydroformylation. In the second stage of the process, the catalyst extraction, the cobalt catalyst prepared in the first stage of the process is extracted from the aqueous phase using an organic phase, preferably using the olefin to be hydroformylated. Besides the olefin, it is occasionally advantageous to use the reaction products and byproducts of the hydroformylation for catalyst extraction, as long as these are insoluble in water and liquid under the reaction conditions selected. After the phase separation, the organic phase loaded with the cobalt catalyst is fed to the third stage of the process, the hydroformylation. In the fourth stage of the process, the decobaltization, the organic phase of the reactor discharge is freed from the cobalt carbonyl complexes in the presence of process water, which may comprise formic acid or acetic acid, by treatment with oxygen or air. During this, the cobalt catalyst is destroyed by oxidation and the resultant cobalt salts are extracted back into the aqueous phase. The aqueous cobalt salt solution obtained from the decobaltization is returned to the first stage of the process, the precarbonylation. The raw hydroformylation product obtained may be fed directly to the hydrogenation. Another way is to isolate a $C_9$ fraction from this in a usual manner, e.g. by distillation, and feed this to the hydrogenation.

The formation of the cobalt catalyst, the extraction of the cobalt catalyst into the organic phase and the hydroformylation of the olefins can also be carried out in a single-stage process in the hydroformylation reactor.

Examples of cobalt compounds which can be used are cobalt(II) chloride, cobalt(II) nitrate, the amine complexes or hydrate complexes of these, cobalt carboxylates, such as cobalt formate, cobalt acetate, cobalt ethylhexanoate and cobalt naphthenate (Co salts of naphthenic acid), and also the cobalt caprolactamate complex. Under the conditions of the hydroformylation, the catalytically active cobalt compounds form in situ as cobalt carbonyls. It is also possible to use carbonyl complexes of cobalt such as dicobalt octacarbonyl, tetracobalt dodecacarbonyl and hexacobalt hexadecacarbonyl.

The aldehyde mixture obtained during the hydroformylation is reduced to give primary alcohols. A partial reduction generally takes place straight away under the conditions of the hydroformylation, and it is also possible to control the hydroformylation in such a way as to give essentially complete reduction. However, the hydroformylation product obtained is generally hydrogenated in a further process step using hydrogen gas or a hydrogen-containing gas mixture. The hydrogenation generally takes place in the presence of a heterogeneous hydrogenation catalyst. The hydrogenation catalyst used may comprise any desired catalyst suitable for hydrogenating aldehydes to give primary alcohols. Examples of suitable commercially available catalysts are copper chromite, cobalt, cobalt compounds, nickel, nickel compounds, which, where appropriate, comprise small amounts of chromium or of other promoters, and mixtures of copper, nickel and/or chromium. The nickel compounds are generally in a form supported on support materials, such as alumina or kieselguhr. It is also possible to use catalysts comprising noble metals, such as platinum or palladium.

A suitable method of carrying out the hydrogenation is a trickle-flow method, where the mixture to be hydrogenated and the hydrogen gas or, respectively, the hydrogen-containing gas mixture are passed, for example cocurrently, over a fixed bed of the hydrogenation catalyst.

The hydrogenation preferably takes place at from 50 to 250° C., in particular from 100 to 150° C., and at a hydrogen pressure of from 50 to 350 bar, in particular from 150 to 300 bar. The desired isononanol fraction in the reaction discharge obtained during the hydrogenation can be separated off by fractional distillation from the $C_8$ hydrocarbons and higher-boiling products.

Gas-chromatographic analysis of the resultant nonanol mixture can give the relative amounts of the individual compounds (the percentages given being percentages by gas chromatogram area):

The proportion of 1-nonanol in the nonanol mixture of the invention is normally from 5 to 15%, preferably from 8 to 12%.

The proportion of the monomethyloctanols is normally from 40 to 100%, preferably from 45 to 80%, in particular from 45 to 60%, and it is particularly preferable for 6-methyl-1-octanol and 4-methyl-1-octanol together to make up at least 35%, very particularly preferably at least 40%, based on the entire nonanol mixture.

The proportion of the dimethylheptanols and monoethylheptanols is normally from 25 to 80%, preferably from 30 to 60%, in particular from 30 to 40%, and it is preferable for 2,5-dimethyl-1-heptanol, 3-ethyl-1-heptanol and 4,5-dimethyl-1-heptanol together to make up at least 20% and in particular 25%, based on the entire nonanol mixture.

The proportion of the hexanols in the entire nonanol mixture is normally from 4 to 40, preferably from 6 to 30% and especially from 6 to 20%.

The nonanol mixture of the invention is preferably composed of from 70 to 99%, especially from 80 to 98% and in particular from 85 to 95%, of a mixture of 1-nonanol, monomethyloctanols, dimethylheptanols and monoethylheptanols.

The density of the nonanol mixture of the invention at 20° C. is normally from 0.75 to 0.9 g/cm$^3$, preferably from 0.8 to 0.88 g/cm$^3$, and particularly preferably from 0.82 to 0.84 g/cm$^3$. The refractive index $n_D^{20}$ is normally from 1.425 to 1.445, preferably from 1.43 to 1.44 and particularly preferably from 1.432 to 1.438. The boiling range at atmospheric pressure is normally from 190 to 220° C., preferably from 195 to 215° C. and particularly preferably from 200 to 210° C.

The dicarboxylic acids used are normally nonaromatic dicarboxylic acids having from 6 to 20 carbon atoms, preferably from 6 to 12 carbon atoms and in particular from 6 to 8 carbon atoms, as a mixture or especially individually, and very particularly solely sebacid acid or solely azelaic acid, and most preferably solely adipic acid.

Other diols which may be used are hydrocarbon derivatives which have from 2 to 13 carbon atoms, especially from 3 to 11 carbon atoms, and preferably have no other substituents alongside the two hydroxyl groups, and may have their hydrocarbon chain interrupted by one or more oxygen atoms (—O—) not bonded to one another, for example 1,2-ethanediol, 1,2-propanediol, 1,3-propanediol, 1,2-butanediol, 1,3-butanediol, 1,4-butanediol, 1,2-pentanediol, 1,3-pentanediol, 2-methyl-1,3-pentanediol, 1,4-pentanediol, 1,5-pentanediol, 1,2-hexanediol, 1,3-hexanediol, 1,4-hexanediol, 1,5-hexanediol, 1,6-hexanediol, diethylene glycol, triethylene glycol, the mononeopentyl glycol ester of hydroxypivalic acid, or mixtures of these diols. Among this group preference is given to sole use of the mononeopentyl glycol ester of hydroxypivalic acid and the sole use of 1,2-propanediol, and sole use of 1,4-butanediol is particularly preferred.

The preparation of the polyesters of the invention is carried out in a manner known per se (cf., for example, "Ullmann's Encyclopedia of Industrial Chemistry", 5th edition, VCH Verlagsgesell-schaft mbH, Weinheim, Vol. A1, pp. 214 et seq. and Vol. A9, pp. 572–575). The chain length and, respectively, average molecular weight of the polyesters can be controlled via the juncture at which the nonanol mixture is added and the amount of this mixture, and these may readily be determined as a matter of routine by the skilled worker. The catalysts used comprise conventional esterification catalysts, in particular dialkyl titanates ((RO)$_2$TiO$_2$, where examples of R are iso-propyl, n-butyl and isobutyl), methanesulfonic acid, sulfuric acid and especially isopropyl-n-butyl titanate.

In one preferred embodiment, the initial charge in the reaction vessel comprises adipic acid, neopentyl glycol, the other diol(s), the esterification catalyst and the entire amount of the nonanol mixture. This reaction mixture is first heated to 100–140° C. and homogenized by stirring. Heating then continues to 160–190° C. at atmospheric pressure. The esterification, with elimination of water, normally begins at about 150° C. The water of reaction formed is removed by distillation via a column. If diol(s) and/or nonanol mixture distill over during this procedure, they are returned to the reaction vessel. The reaction vessel is then heated to 200–250° C., and further water of reaction is stripped at a pressure of from 150 to 300 mbar, by passing nitrogen through the reaction mixture. Stirring of the reaction mixture is continued under these conditions until its acid value has reached <15 mg of KOH per g of reaction mixture. Reaction is then continued at 200–250° C. and at a pressure in the range from 10 to 150 mbar in order to esterify free carboxylic acid groups. Residual water and excess nonanol mixture are stripped here, using an increased flow of nitrogen and stirring, until the acid value per g of reaction mixture has reached <1 mg of KOH. The reaction mixture is then filtered at 100–140° C.

The resultant polyesters of the invention are normally composed of
from 40 to 50 mol %, preferably from 45 to 50 mol % and particularly preferably from 48 to 50 mol % of adipic acid units,
from 5 to 48 mol %, preferably from 10 to 25 mol % and particularly preferably from 15 to 20 mol %, of neopentyl glycol units,
from 2 to 35 mol %, preferably from 15 to 30 mol % and particularly preferably from 20 to 28 mol %, of units of one or more other diols, and from 2 to 20 mol %, preferably from 5 to 15 mol % and particularly preferably from 8 to 12 mol % of nonanol units.

The polyesters of the invention generally have densities of from 1 to 1.15 g/cm$^3$, preferably from 1.03 to 1.12 g/cm$^3$ and particularly preferably from 1.04 to 1.11 g/cm$^3$. Their viscosity is normally from 1000 to 20 000 mPa.s, preferably from 1500 to 15 000 mPa.s and particularly preferably from 1800 to 14 000 mPa.s. The refractive index $n_D^{20}$ is generally from 1.45 to 1.485, preferably from 1.460 to 1.480, and particularly preferably from 1.462 to 1.475. The average molecular weight, determined by gel permeation chromatography, is normally from 500 to 15 000, preferably from 2000 to 10 000, and particularly preferably from 2800 to 8000 (polystyrene equivalents, see below).

One way of determining the chemical composition of the plasticizers of the invention is hydrolysis to give the monomeric building blocks of dicarboxylic acid(s), neopentyl glycol, other diol(s) and nonanol mixture, and to use a method known per se to determine the resultant amounts of these compounds.

The preferred procedure for preparing and studying the plasticized PVC compounds prepared using the polyesters of the invention is as follows:

A mixture is first prepared from PVC powder, preferably PVC powder prepared by the suspension process, from the polyester of the invention as plasticizer, and also, where appropriate, from other additives, such as stabilizers, lubricants, fillers, pigments, dyes, flame retardants, light stabilizers, antistats, blowing agents, biostabilizers. This mixture is then plastified on a roll mill and roll-milled to give what is known as a milled sheet. The milled sheet is then compression molded to give a plasticized PVC film, on which the performance tests are then carried out.

The migration behavior of the plasticizer can be determined (to DIN 53405) by observing the weight loss from a plasticized specimen between two specimens of another plastic without this plasticizer.

The compatibility of a plasticizer can be determined via the weight loss in a heating chamber at high atmospheric humidity.

The examples below illustrate the invention in further detail.

EXAMPLES

Neopentyl glycol and 1,4-butanediol from BASF AG were used. Isopropyl n-butyl titanate came from DuPont.

A) Preparation of a Plasticizer of the Invention

A.1) Butene Dimerization

The butene dimerization was carried out continuously in an adiabatic reactor, composed of two subreactors (length: in each case 4 m, diameter: in each case 80 cm) with intermediate cooling at 30 bar. The starting product used was a raffinate II with the following makeup:

| | |
|---|---|
| isobutane | 2% by weight |
| n-butane | 10% by weight |
| isobutene | 2% by weight |
| 1-butene | 32% by weight |
| trans-2-butene | 37% by weight and |
| cis-2-butene | 17% by weight. |

The catalyst used was a material in accordance with DE-A 4339713, composed of 50% by weight of NiO, 12.5% by weight of TiO$_2$, 33.5% by weight of SiO$_2$ and 4% by weight of Al$_2$O$_3$, in the form of 5×5 mm tablets. The reaction was carried out with a throughput of 0.375 kg of raffinate II per l of catalyst and hour, with a return ratio of unreacted C$_4$ hydrocarbons returned to fresh raffinate II of 3, an inlet temperature at the 1st subreactor of 38° C. and an inlet temperature at the 2nd subreactor of 60° C. The conversion, based on the butenes present in the raffinate II, was 83.1%, and the octene selectivity was 83.3%. Fractional distillation of the reactor discharge was used to separate off the octene fraction from unreacted raffinate II and from the high-boilers.

A.2) Hydroformylation and Hydrogenation 750 g of the octene mixture prepared according to section A.1 of the examples were reacted for 5 hours discontinuously, in an autoclave, with 0.13% by weight of dicobalt octacarbonyl Co$_2$(CO)$_8$ as catalyst, with addition of 75 g of water, at 185° C. and with a synthesis gas pressure of 280 bar at a ratio of H$_2$ to CO in the mixture of 60/40. Further material was injected to make up for the consumption of synthesis gas, seen in a fall-off of pressure in the autoclave. After releasing the pressure in the autoclave, the reaction discharge, with 10% strength by weight acetic acid, was freed oxidatively from the cobalt catalyst by introducing air, and the organic product phase was hydrogenated using Raney nickel at 125° C. and with a hydrogen pressure of 280 bar for 10 h. The isononanol fraction was separated off from the C$_8$ paraffins and the high-boilers by fractional distillation of the reaction discharge.

The composition of the isononanol fraction was analyzed by gas chromatography. A specimen was trimethylsilylated in advance using 1 ml of N-methyl-N-trimethylsilyltrifluoracetamide per 100 μl of specimen for 60 minutes at 80° C. Use was made of a Hewlett Packard Ultra 1 separating column of length 50 m and internal diameter of 0.32 mm, with a film thickness of 0.2 μm. Injector temperature and detector temperature were 250° C., and the oven temperature was 120° C. The split was 110 ml/min. The carrier gas used was nitrogen. The admission pressure was set at 200 kPa. 1 μl of the specimen was injected and detected by FID. The compositions determined for specimens by this method (percentage by gas chromatogram area) were as follows:

| | |
|---|---|
| 11.0% | 1-nonanol |
| 20.8% | 6-methyl-1-octanol |
| 20.5% | 4-methyl-1-octanol |
| 5.3% | 2-methyl-1-octanol |
| 11.0% | 2,5-dimethyl-1-heptanol |
| 8.7% | 3-ethyl-1-heptanol |
| 6.2% | 4,5-dimethyl-1-heptanol |
| 2.9% | 2-ethyl-1-heptanol |
| 2.8% | 2,3-dimethyl-1-heptanol |
| 3.0% | 2-ethyl-4-methyl-1-hexanol |
| 2.7% | 2-propyl-1-hexanol |
| 1.6% | 3-ethyl-4-methyl-1-hexanol |

Remainder to 100%: other alkanols having 9 carbon atoms

The density of this nonanol mixture was measured at 20° C. as 0.8326, and the refractive index $n_D^{20}$ as 1.4353. The boiling range at atmospheric pressure was from 204 to 209° C.

A.3) Esterification 6500 kg of adipic acid, 1950 kg of neopentyl glycol (90% purity), 2276 kg of 1,4-butanediol, 1294 kg of nonanol mixture from section A.2 of the examples, and also 0.5 kg of isopropyl n-butyl titanate were charged to a 15 m³ reactor, heated to 130° C. and homogenized by stirring. The reaction mixture was then heated to 175° C. at atmospheric pressure and stirred for 4 h. Esterification, with elimination of water, began at about 150° C. The water of reaction formed was removed by distillation via a column. The neopentyl glycol, 1,4-butanediol and nonanol mixture distilled over were removed and returned. The reaction mixture was then heated to 230° C., the pressure was reduced to 200 mbar, and nitrogen (2 m³/h) was passed through the reaction mixture to remove further water of reaction. After a total of 22 h of stirring under these reaction conditions, the acid value of the reaction mixture had fallen to a value of <15 mg of KOH/g. The reaction mixture was then stirred at 230° C. and 100 mbar, while passing an increased flow of nitrogen at 30 m³/h, thus removing residual water and excess nonanol mixture. After 10 h of stirring under these reaction conditions the acid value of the reaction mixture had fallen to a value of <1 mg of KOH/g. The reaction product was then filtered at 120° C., primarily in order to remove insoluble products derived from the catalyst.

The resultant plasticizer was composed of 49 mol % of adipic acid units, 17 mol % of neopentyl glycol units, 25 mol % of 1,4-butanediol units and 9 mol % of nonanol units. The plasticizer had a density of 1.092 g/cm³, a viscosity of 11710 mPa.s and a refractive index $n_D^{20}$ of 1.471.

The average molelcular weight was 6400 (polystyrene equivalents). It was determined by gel permeation chromatography using a calibration curve drawn up by using polystyrene (from Macherey & Nagel or Polymer Laboratories). For this, about 50 mg of a specimen were made up to a total volume of 10 ml using tetrahydrofuran. The measurement took place on a combination of 4 PL-GEL columns from Polymer Laboratories, each of 300 mm length and 7.5 mm diameter:

| | |
|---|---|
| Particle size | 5 μm |
| Pore width | 2 columns: 100 nm, 2 columns: 1000 nm |
| Mobile phase | tetrahydrofuran |
| Flow | 0.8 ml/min |
| Injection volume | 100 μl |
| Temperature | 35° C. |
| Detection | refractive index detector. |

B) Preparation of Plasticized PVC Compounds

B.1.) PVC Compound with a Plasticizer of the Invention 150 g of Vinoflex® S 7114 suspension PVC (BASF AG), 105 g of the plasticizer from section A of the examples and 2 g of Lankromark® LZB 753 Ba/Zn stabilizer were mixed in a manual mixer at room temperature. The mixture was then plastified on a steam-heated laboratory roll mill (Collin 150) and processed to give a milled sheet. The temperature of each of the two rolls was 170° C., and the rotation rates were 15 rpm for the front roll and 12 rpm for the rear roll. The milling time was 5 minutes. This gave a milled sheet of thickness 0.55 mm. The cooled milled sheet was then pressed at 180° C. and a pressure of 220 bar in a Collin 400 P press, giving a plasticized PVC film of thickness 0.5 mm within a period of 400 s.

B.2) PVC Compound with a Known Plasticizer

In a manner similar to that of example B.1, a plasticized PVC film was produced using a commercially available polyester plasticizer: Dainippon Ink & Chemicals DIC W-2050. This plasticizer was composed of 50 mol % of adipic acid units, 31 mol % of neopentyl glycol units, 9 mol % of 1,4-butanediol units and 9 mol % of 2-ethylhexanol units as capping group.

C) Testing of PVC Compounds

Compatibility and migration behavior with respect to the following plastics were then determined on the plasticized PVC films from section B):

an acrylonitrile-butadiene-styrene copolymer (Terluran 877® T), a polystyrene (Polystyrol® 168 N), an impact-modified polystyrene (Polystyrol® 474 K), an acrylate-styrene-acrylonitrile copolymer (Luran® S 757 R) and a polymethyl methacrylate (Lucryl® G 88 E).

The migration behavior of the plasticizers was determined (to DIN 53405) as follows: a specimen disk of the plasticized PVC compound with diameter 50 mm and thickness 0.5 mm was placed between two disk specimens of another plastic with diameter 60 mm and thickness 1 mm. The sandwich specimen was then introduced between two glass plates, loaded with a weight of 5 kg and stored in a drying cabinet for 30 days at 50° C. The weight loss of the plasticized PVC compound after 30 days served as a measure of the migration behavior of the plasticizer.

The compatibility of the plasticizers in plasticized PVC compound was determined by storing the plasticized PVC compound in a drying cabinet at 70° C. and 100% relative humidity for a prolonged period. The weight loss of the plasticized PVC compound due to discharge of plasticizer was determined by weighing at particular intervals.

The test specimens used for this test were films of dimension 75×110×0.5 mm. A perforation was made on the broad side of the film, and the films were marked (soldering iron) and weighed. Once ready, the weighed films were suspended on a wire rack and placed in a glass tank in which there was about 5 cm depth of deionized water. The films here did not touch each other or the surface of the water. The glass tank was sealed using a polyethylene film so as to be steam-tight, in order to prevent escape of the water vapor subsequently produced therein. The water level in the tank was checked daily and topped up as required. Each day, two of the films were removed from the glass tank and suspended freely in the atmosphere for 1 hour. The surfaces of these films were then cleaned with methanol, and the films were dried while freely suspended for 16 h at 70° C. in a drying cabinet, using forced convection, without any addition of humidification of the air. The films were then freely suspended for 1 hour, followed by weighing. At each stage, the arithmetic mean of the weight losses from the films was calculated.

The results of the experiments are given in Table 1:

TABLE 1

| Plasticized PVC compound | as in example B.1 (inventive) | as in example B.2 (comparison) |
|---|---|---|
| Compatibility test at 70° C. and 100% relative humidity: weight loss from plasticized PVC compound (% by weight) | | |
| After 1 d | 0.10 | 0.24 |
| After 3 d | 0.18 | 0.29 |
| After 7 d | 0.25 | 0.36 |

TABLE 1-continued

| Plasticized PVC compound | as in example B.1 (inventive) | as in example B.2 (comparison) |
|---|---|---|
| After 14 d | 0.25 | 0.43 |
| After 28 d | 0.24 | 0.57 |
| Migration test at 50° C.: weight loss from plasticized PVC compound (% by weight) after 30 d in contact with: | | |
| acrylonitrile-butadiene-styrene copolymer (Terluran ® 877 T) | 0.4 | 0.8 |
| polystyrene (Polystyrol ® 168 N) | 0.1 | 0.6 |
| impact-modified polystyrene (Polystyrol ® 474 K) | 0.2 | 0.7 |
| acrylate-styrene-acrylonitrile copolymer (Luran ® S 757 R) | 0.6 | 0.8 |
| polymethyl methacrylate (Lucryl ® G 88 E) | 0.3 | 0.5 |

The results in Table 1 show that the polyester plasticizers of the invention have markedly higher compatibility and markedly lower tendency to migration—recognizable in each case from a lower weight loss—than commercially available products not capped using nonanol mixture.

We claim:

1. A polyester suitable as a plasticizer and obtainable by reacting aliphatic dicarboxylic acids, neopentyl glycol, at least one other diol and a nonanol mixture, where the nonanol mixture is mainly composed of 1-nonanol, of monomethyloctanols, of dimethylheptanols and of monoethylheptanols.

2. A polyester as claimed in claim 1, in which the entire nonanol mixture has a proportion of from 40 to 100 percent, by gas-chromatogram area, of monomethyloctanols.

3. A polyester as claimed in claim 1, the preparation of which uses 1,4-butanediol as other diol.

4. A polyester as claimed in claim 1, the preparation of which uses the mononeopently glycol ester of hydroxypivalic acid as other diol.

5. A polyester as claimed in claim 1, the preparation of which uses adipic acid as aliphatic dicarboxylic acid.

6. A process for preparing the polyester as claimed in claim 1, which comprises reacting aliphatic dicarboxylic acids, neopentyl glycol, at least one other diol, and a nonanol mixture composed mainly of 1-nonanol, of monomethylcotanols, of dimethylheptanols and of monoethylheptanols, under esterification conditions known per se.

* * * * *